April 24, 1962  A. HUET  3,030,902
MANUFACTURE OF TUBULAR ELEMENTS
Filed June 28, 1956
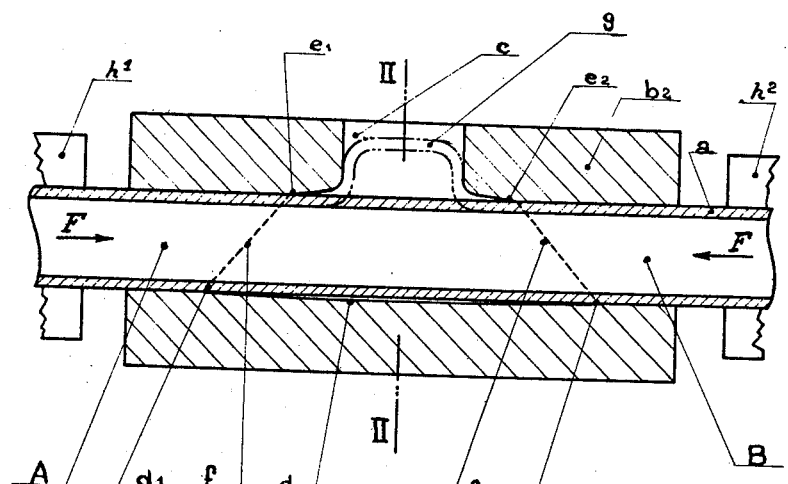
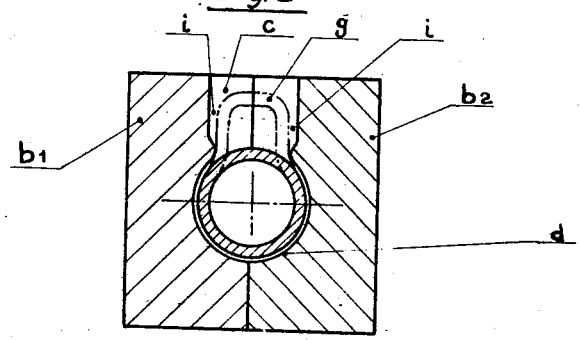

United States Patent Office 3,030,902
Patented Apr. 24, 1962

3,030,902
MANUFACTURE OF TUBULAR ELEMENTS
André Huet, 48 Ave. du Président Wilson, Paris, France
Filed June 28, 1956, Ser. No. 594,474
Claims priority, application France Aug. 2, 1955
4 Claims. (Cl. 113—49)

This invention relates to the manufacture of tubular elements and more especially to apparatus for manufacturing bulbs or excrescences on straight metal tubes.

It has already been proposed, in order to obtain an eccentric bulge or bulb on a straight tube, i.e., a unilateral or asymmetric swelling in the wall of a tube, that this tube, previously heated, be subjected to an axial compression stress in a die which has an opening where the extruded metal flows to constitute the bulb. In the known process, the inside of the tube is filled, for example with sand, or a mandrel of the same calibre as the internal section of the tube is placed in the latter, so that the wall of the tube, held between the mandrel and the die, can be forced only towards the outside, i.e. into the opening in the die.

Applicant has unexpectedly found that it is possible to leave out any kind of filling, or the mandrel placed inside the tube, if the die, instead of conforming in size to the external diameter of the tube, is slightly additionally hollowed out to a diameter greater than that of the tube in the region corresponding to the extrusion of the metal at the time of the compression. The effect of this additional hollowing out can be explained as follows: because of the hollowing out, the tube, previously heated and placed in the die, does not come into contact with the die in the region to be treated, and, consequently, remains hotter in this region than in the adjoining areas which cool on contact with said die. The resulting difference in expansion causes the hotter part of the region of the tube which is to be extruded to retain a diameter very slightly greater than in the adjoining parts, so that the swelling of the tube is already started in the right direction, i.e., away from the axis, and, without any need for providing a mandrel in the tube, the axial compression on the tube which follows produces the displacement of the metal away from the axis, i.e. into the opening in the die.

Furthermore, the extrusion of the metal is effected more easily and rapidly because the tube remains hotter in the treated region and a larger bulb is obtained.

Finally, moreover, thanks to the additional hollowing out of the die, it is possible, when necessary, during the extrusion operation, to pass hot gases all around the tube during the compression to maintain its temperature. Since there is no mandrel, it is even possible to dispose inside the tube a bank of heaters to maintain the treated region at the desired temperature during the operation.

The additional hollowing out is only slight, for example, of the order of a millimetre for tubes of 50 mm. external diameter, and it is found, after the compression is completed, that the thickness of the wall of the tube opposite the bulb is only slightly increased.

The following description, made with reference to the accompanying drawings given by way of example, will make clear the manner in which the invention is to be performed. In such drawings—

FIG. 1 shows in longitudinal section the tube placed in the die which is the subject of the invention.

FIG. 2 is a section on the line II—II of FIG. 1.

To obtain the unilateral or eccentric bulb required on the tube $a$, a die is used, preferably in two pieces, $b^1$ and $b^2$, whose internal diameter corresponds to the external diameter of tube $a$, and which has a lateral opening $c$ of the same size as the bulb which is desired to form on the tube.

In accordance with the present invention, the cavity made in the die $b^1$, $b^2$ for holding the tube $a$ has an additional hollowing out $d$ in the region of the tube where the bulb is required, i.e. as will be seen in FIG. 1 and FIG. 2, the internal diameter of the cavity made in the die is very slightly larger at this part than the external diameter of tube $a$. This cavity $d$ is again reduced to the external diameter of the tube $d^1$, $d^2$ at a certain distance from each side of the opening $c$ in the die, and affects the whole circumference of the tube $a$. However, on the side of the opening $c$, as can be seen in FIG. 1, it extends only from $e^1$ to $e^2$ over a length less than on the opposite generatrix, the hollowed out contour being represented by the dotted lines $f$ in FIG. 1.

After the tube has been brought to the required temperature, it is placed in the die, and the part of the tube to be treated, not coming into direct contact with the die $b^1$, $b^2$, remains hotter than the regions AB of this tube which are situated on either side. This results in a very small difference in expansion which produces in the middle region of the tube, a diameter greater than that in the regions AB, hence an incipient swelling which, when the axial pressure is applied in the direction of the arrows FF, has the effect that the swelling already started will be continued in the direction away from the axis of the tube $a$, i.e. the wall will be extruded into the opening $c$ to constitute the bulb $g$, indicated by a chain-dotted line.

The axial pressure F may be applied either at the ends of the terminal sections of a portion of tube $a$, or by means of clamp jaws, such as $h^1$ and $h^2$ shown schematically in FIG. 1, enclosing the tube on the outside, in which case the latter may be of any length.

At the end of the operation it is found that only a slight thickening has occurred in the wall of the tube opposite the bulb $g$, the metal having risen towards the opening $c$.

The presence in the part under treatment of a space between the wall of the tube $a$ and the die makes it possible, during the operation of compression, to pass hot gases through the opening $c$ around the whole circumference of the tube $a$, and consequently to maintain the temperature of this region, thereby facilitating the operation, speeding it up and making it possible to obtain a larger bulb $g$. For thick tubes or tubes of large diameter, means are available for heating the interior of the tube which remains empty making it possible to continue heating the treated portion during the compression.

Moreover, it is envisaged that, at the end of the operation, one may, if it is considered necessary, pass a calibrating mandrel into the inside of the tube $a$ to render uniform the thickness and diameter of the tube in the treated region.

The fact that the operation is carried out without a mandrel and without any kind of filling, and that it is possible to apply the compression by means of external jaws $h^1$ and $h^2$, makes possible the manufacture of a bulb at any part of a tube of great length.

Moreover, the straight tube with a bulb thus obtained, having no appreciable variation in shape or extra thickening, may subsequently be bent over a roller, which results in a very regular bulbed curve.

As can be seen in FIG. 2, the opening $c$ provided in the die $b^1$, $b^2$ for the formation of the bulb is slightly widened beyond its base, so that the bulb $g$ will not come into direct contact with the walls of the opening but leaves a space $i$ which prevents the premature cooling of the extruded metal, which allows a bulb of greater height to be obtained.

It is evident that modifications of detail can be made in the application of this invention without going outside the scope of the following claims.

What I claim is:

1. A die for the manufacture of a unilateral bulb on a straight tube blank by axial compression of the tube blank in the die, said die having a cavity open at axially-opposite ends to receive the tube and a lateral opening to receive the metal defining the bulb, said die being formed from two cooperating segments having mating faces along a longitudinal plane passing through said lateral opening, the cavity of the die in the region of said ends having a diameter corresponding to the external diameter of the tube blank to be compressed but the cavity of the die in the region of said lateral opening where the bulb is to be formed having an enlarged portion along its entire circumference and extending on both axial sides of said lateral opening, said enlarged portion having a gradually varying diameter slightly greater than the diameter of the remainder of the cavity in the die, and the diameter of said enlarged portion being sufficiently great that the entire circumference of the tube blank is out of contact with the cavity walls defining said enlarged portion prior to axial compression whereby chilling of the tube blank by the die in said enlarged portion is prevented, the entire remainder of said cavity throughout the entire length of said die having said diameter corresponding to the external diameter of said tube.

2. A die for the manufacture of a unilateral bulb on a straight tube blank by axial compression of the tube blank in the die, said die having a cavity open at axially-opposite ends to receive the tube and a lateral opening to receive the metal defining the bulb, said die being formed from two cooperating segments having mating faces along a longitudinal plane passing through said lateral opening, the cavity of the die in the region of said ends having a diameter corresponding to the external diameter of the tube blank to be compressed but the cavity of the die in the region of said lateral opening where the bulb is to be formed having an enlarged portion along its entire circumference and extending on both axial sides of said lateral opening, said enlarged portion having a gradually varying diameter slightly greater than the diameter of the remainder of the cavity in the die, and the diameter of said enlarged portion being sufficiently great that the entire circumference of the tube blank is out of contact with the cavity walls defining said enlarged portion prior to axial compression whereby chilling of the tube blank by the die in said enlarged portion is prevented, said enlarged portion extending axially of said die for a greater distance in the area of said cavity diametrically opposite said lateral opening, the entire remainder of said cavity throughout the entire length of said die having said diameter corresponding to the external diameter of said tube.

3. A die for the manufacture of a unilateral bulb on a straight tube blank by axial compression of the tube blank in the die, said die having a cavity open at axially-opposite ends to receive the tube and a lateral opening to receive the metal defining the bulb, said die being formed from two cooperating segments having mating faces along a longitudinal plane passing through said lateral opening, the cavity of the die in the region of said ends having a diameter corresponding to the external diameter of the tube blank to be compressed but the cavity of the die in the region of said lateral opening where the bulb is to be formed having an enlarged portion along its entire circumference and extending on both axial sides of said lateral opening, said enlarged portion having a gradually varying diameter slightly greater than the diameter of the remainder of the cavity in the die, and the diameter of said enlarged portion being sufficiently great that the entire circumference of the tube blank is out of contact with the cavity walls defining said enlarged portion prior to axial compression whereby chilling of the tube blank by the die in said enlarged portion is prevented, said die being adapted to accommodate means to heat during axial compression that part of the tube blank lying in said enlarged portion of the die cavity, the entire remainder of said cavity throughout the entire length of said die having said diameter corresponding to the external diameter of said tube.

4. A die for the manufacture of a unilateral bulb on a straight tube blank by axial compression of the tube blank in the die, said die having a cavity open at axially-opposite ends to receive the tube and a lateral opening to receive the metal defining the bulb, said die being formed from two cooperating segments having mating faces along a longitudinal plane passing through said lateral opening, the cavity of the die in the region of said ends having a diameter corresponding to the external diameter of the tube blank to be compressed but the cavity of the die in the region of said lateral opening where the bulb is to be formed having an enlarged portion along its entire circumference and extending on both axial sides of said lateral opening, said enlarged portion having a gradually varying diameter slightly greater than the diameter of the remainder of the cavity in the die, and the diameter of said enlarged portion being sufficiently great that the entire circumference of the tube blank is out of contact with the cavity walls defining said enlarged portion prior to axial compression whereby chilling of the tube blank by the die in said enlarged portion is prevented, said cavity being adapted to accommodate a flow of hot gases through the space left free between the tube blank and the die in said enlarged portion, the entire remainder of said cavity throughout the entire length of said die having said diameter corresponding to the external diameter of said tube.

References Cited in the file of this patent

UNITED STATES PATENTS

| | | |
|---|---|---|
| 528,661 | Engel | Nov. 6, 1894 |
| 1,636,111 | Rode | July 19, 1927 |
| 1,771,187 | Murray | July 22, 1930 |
| 1,886,831 | Murray | Nov. 8, 1932 |
| 1,946,117 | Sparks | Feb. 6, 1934 |
| 2,203,868 | Gray et al. | June 11, 1940 |
| 2,238,038 | Cornell | Apr. 15, 1941 |
| 2,243,809 | Wendel | May 27, 1941 |
| 2,271,391 | Drake | Jan. 27, 1942 |
| 2,507,859 | Keller | May 16, 1950 |
| 2,603,175 | Wurzberger | July 15, 1952 |
| 2,652,121 | Kearns et al. | Sept. 15, 1953 |

FOREIGN PATENTS

| | | |
|---|---|---|
| 511,524 | Germany | Oct. 30, 1930 |
| 14,747 | Great Britain | Aug. 27, 1898 |